Nov. 17, 1931.   S. F. DAVENPORT   1,832,768
LURE ATTACHMENT
Filed Oct. 15, 1930

Inventor
S. F. Davenport
By
Eccleston & Eccleston,
Attorneys

Patented Nov. 17, 1931

1,832,768

UNITED STATES PATENT OFFICE

SAM F. DAVENPORT, OF AUBURN, INDIANA, ASSIGNOR TO THE CREEK CHUB BAIT CO., OF GARRETT, INDIANA

LURE ATTACHMENT

Application filed October 15, 1930. Serial No. 488,937.

This invention relates to artificial baits or lures and is especially designed for use with so-called spoons, wobbling spoons, spinners, and any other type of lure which is adapted to rotate or has a tendency to rotate when drawn through the water. It is usual in such devices to provide a swivel connection between the lure and fish line so as to avoid any twisting of the line when the bait is in use. However, for various reasons these swivels do not always function perfectly and consequently the lines quite frequently become twisted and knotted. It is an object of the present invention, therefore, to provide some means for preventing the rotation of the end of the swivel associated with the fish line, thereby necessitating the operation of the swivel and preventing any twisting of the line.

Another object of the invention resides in accomplishing the foregoing object by means of a stabilizer having a gyroscopic action sufficient to maintain the line against twisting.

Other objects and advantages of the invention will be apparent from the following description when taken in connection with the accompanying drawings, in which Figure 1 is a perspective view of the complete device.

Figure 1:
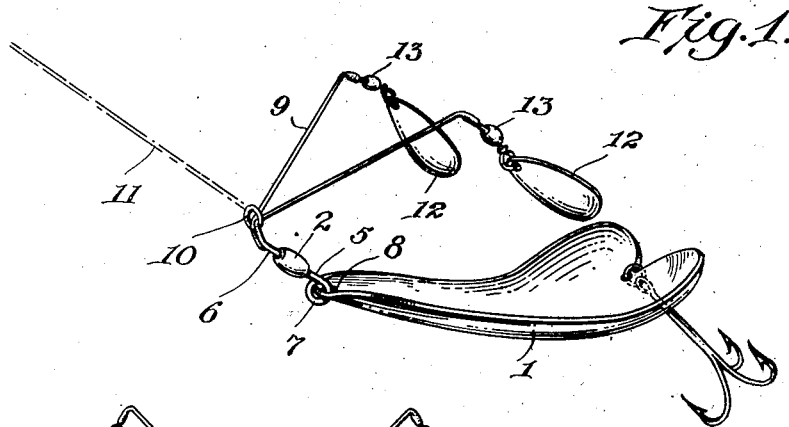
Figure 2:
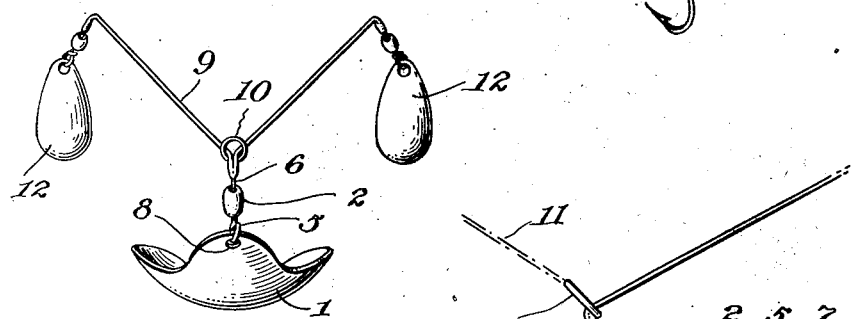
Figure 2 is a front elevational view thereof.
Figure 3:
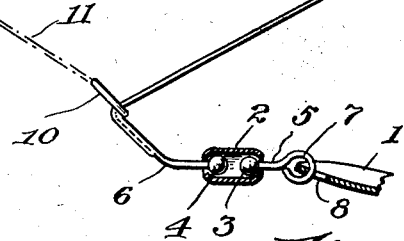
Figure 3 is a detail sectional view through the swivel and related parts.

Referring to the drawings in detail, and especially to Figures 1, 2 and 3, the numeral 1 indicates a spoon which is so designed as to wobble when drawn through the water. Under certain circumstances the spoon will rotate about its axis, and in order to avoid twisting the line it is usual to employ a swivel connection between the front end of the spoon and the line. This swivel comprises a sleeve 2 in which are loosely mounted the enlarged ends 3 and 4 of wire connections 5 and 6. The wire 5 is provided with an eye 7 passing through an opening 8 in the front end of the spoon.

The wire 6 is soldered or otherwise connected to an element 9 in the form of a V-shaped wire, and is also provided with an eye 10 to afford an anchorage for the fish line 11. To the free ends of the element 9 are connected small spoons 12, and it will be noted that these spoons are also provided with swivels 13 to allow freedom of action.

The spoons 12, in addition to attracting fish, provide a gyroscopic action which functions as a stabilizer for the element 9 and also the wire 6 and its swivel element 4. It will be apparent, therefore, that by reason of this combination of elements the liability of the swivel becoming inoperative with a consequent twisting of the line, is largely eliminated.

Figure 4:
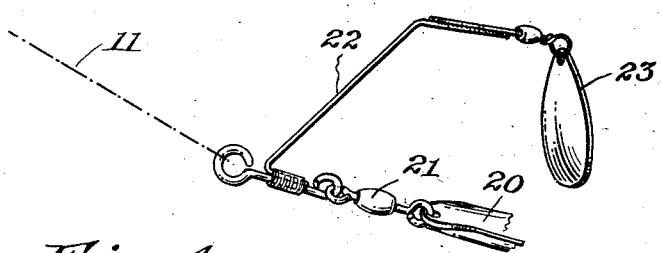
Figure 4 is a fragmentary perspective view of a somewhat modified construction.

In the modified construction shown in Figure 4, the spoon 20 is connected to a slightly different type of stabilizer by means of a swivel 21. This stabilizer consists of a single arm 22 to which is swiveled a spoon 23. As in the previously described form of the invention the spoon 23 serves by means of its gyroscopic action to stabilize the arm 22 and thereby prevent the twisting of the line.

While the lure herein shown and described is a wobbling spoon, it is to be understood that the invention is intended for use with any type of lure which is liable to cause a twisting of the fish line such as a spoon, spinner, and some of the wooden lures in common use.

From the above description and attached drawings it will be apparent to those skilled in the art that I have devised an attachment for fish lures and especially lures of the spoon or wobbling type which will minimize if not entirely eliminate any twisting of the line, and that this result is obtained without any substantial increase in the cost of the lure.

The invention is, of course, susceptible of certain minor changes in the details of construction, and it is intended therefore, that the drawings be regarded as illustrative of the invention rather than in a limiting sense.

Having fully described my invention, what I claim as new and desire to secure by Letters Patent is:

1. An attachment for fish lures including a wire provided with an anchorage means for a line, a swivel connected with said wire, and means connected with said wire to prevent its rotation.

2. An attachment for fish lures including a wire provided with an anchorage means for a line, a swivel connected with said wire, and a revolving spoon connected with said wire to prevent its rotation.

3. An attachment for fish lures including a wire provided with an anchorage means for a line, a swivel connected with said wire, a second wire extending outwardly from said first-mentioned wire, and a revolving spoon mounted on the end of said second-mentioned wire.

4. An attachment for fish lures including a wire provided with an anchorage means for a line, a swivel connected with said wire, a second wire of V-shaped design connected with said first-mentioned wire, and revolving spoons mounted on the free ends of said V-shaped wire.

SAM F. DAVENPORT.